United States Patent

[11] 3,583,716

| [72] | Inventor | Marion F. Daniel, Jr.<br>Greenville, S.C. |
|---|---|---|
| [21] | Appl. No. | 797,098 |
| [22] | Filed | Feb. 6, 1969 |
| [45] | Patented | June 8, 1971 |
| [73] | Assignee | The Singer Company<br>New York, N.Y. |

[54] CHUCK ASSEMBLY FOR POWER TOOLS
4 Claims, 6 Drawing Figs.

[52] U.S. Cl. ................................................ 279/81, 143/156
[51] Int. Cl. ..................................................... B23b 31/22
[50] Field of Search .......................................... 279/81, 75, 71, 72, 73, 30; 143/156, 68.5, 68.6; 30/273, 275

[56] References Cited
UNITED STATES PATENTS

| 1,341,934 | /1920 | Schoenborn | 279/81 |
| 2,722,244 | 11/1955 | Schultz | 143/156 |
| 3,185,493 | 5/1965 | Chadwick | 279/81X |
| 3,186,726 | 6/1965 | Wilhelm | 143/156X |

*Primary Examiner*—Andrew R. Juhasz
*Assistant Examiner*—Donald D. Evenson
*Attorneys*—Marshall J. Breen, Chester A. Williams, Jr. and Harold Weinstein

ABSTRACT: This disclosure relates to a chuck assembly for a power tool, such as a saber saw, and permits quick attachment or detachment of the saw blade to the saw bar by a simple turning movement of a collar member of the assembly to effect locking or unlocking, respectively, of said blade.

PATENTED JUN 8 1971
3,583,716
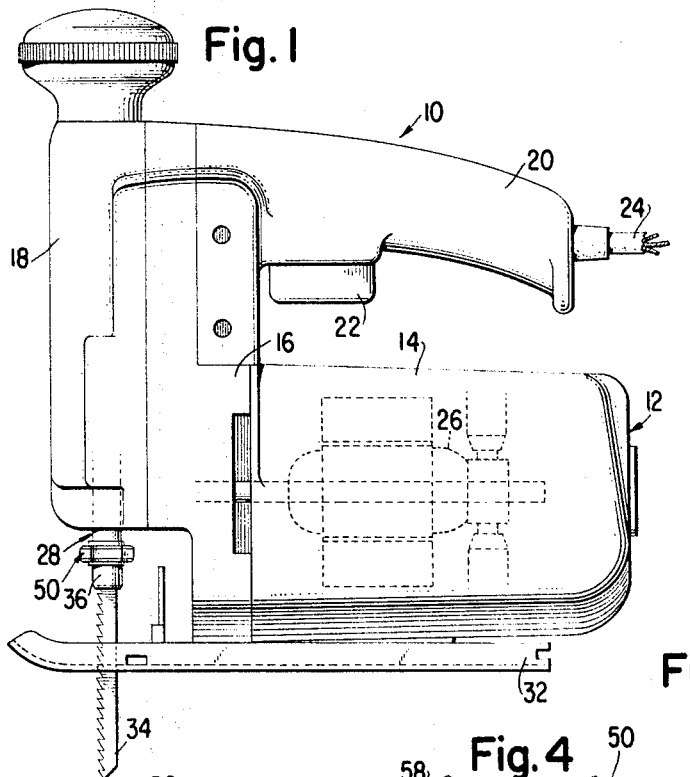
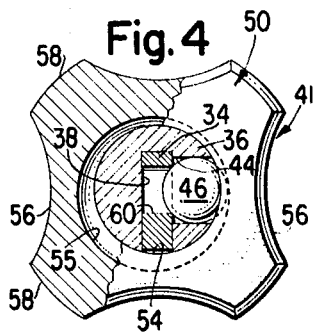
INVENTOR.
Marion F. Daniel Jr.
BY
Marshall J. Breen
ATTORNEY

CHUCK ASSEMBLY FOR POWER TOOLS

BACKGROUND OF THE INVENTION

Heretofore chuck assemblies for power tools, such as saber saws, required the use of one or more threaded members to clamp the saw blade to the saw bar. This had several disadvantages among which are the possibility of accidental loosening of the chuck assembly due to vibration, especially as the threaded parts became worn, and operator inconvenience in always requiring auxiliary tools to enable blade changes.

SUMMARY OF THE INVENTION

In accordance with the present invention the novel chuck assembly is utilized to connect an implement to a driven toolbar of a power tool. The toolbar is journaled in the housing of the power tool along with an electric motor which drives the same. The free end of the toolbar has a pair of intersecting apertures formed therein and projects from the housing. The intersecting apertures are in communication with the axis of the toolbar. The toolbar carries a first holding means and a second hold means. The first hold means is disposed in one of the apertures and the second hold means is turnably connected to the free end of the toolbar to hold captive the first holding means whereby, after insertion of the implement into the other aperture, the second holding means is shifted into engagement with the first holding means to force the first holding means to lock against the implement.

It is therefore an object of the present invention to provide an improved chuck assembly which overcomes the prior art disadvantages; which is simple, economical and reliable; which is operable upon the turning movement of one of the members thereof to effect quick attachment or detachment of the implement; which is operable to permit positive locking of the implement; which does not require auxiliary hand tools to operate; and which is less susceptible to loosening caused by vibration.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which;

FIG. 1 is a longitudinal elevational view of a saber saw illustrating the present invention, FIG. 2 is an enlarged sectional view of the left side of FIG. 1 showing the improved chuck assembly, FIG. 3 is an elevational view, partly in section, taken along line 3–3 of FIG. 2, FIG. 4 is a plan view, partly in section, taken along line 4–4 of FIG. 3, and showing the improved chuck assembly in locked position, FIG. 5 is a plan view, partly in section, of the improved chuck assembly in an unlocked position, FIG. 6 is an exploded perspective view of the improved chuck assembly.

DESCRIPTION OF THE INVENTION

A conventional saber saw 10 is illustrated in FIG. 1 embodying the present invention, but it will be understood that the present invention is equally applicable to other power tools and devices which utilize chuck assemblies. The saber saw 10 has a housing 12 which includes a motor housing 14 the front end of which connects to a gear housing 16 enclosed by a cover 18. A handle 20 cantilevers over the motor housing 14 and carries a switch 22 connected through an electric line 24 to a motor 26. Actuation of switch 22 operates the motor 26 to drive a gear train (not shown) which reciprocates a toolbar or saw bar 28 journaled in the cover 18 of the housing 12. The toolbar or saw bar 28 has an axis 30 disposed substantially normal to a baseplate 32 which engages a workpiece, and below which an implement or saw blade 34 is connected to the saw bar by an improved chuck assembly 41, and extends below the baseplate 32.

The saw bar 28 has a free end 36 illustrated in FIGS. 2, 3 and 6 projecting outwardly from the housing 12, which carries the chuck assembly 41 as an integral part thereof. A longitudinal aperture or slot 38 extends upwardly from the flat bottom of the free end 36 to form an opening at the bottom and along the front side thereof. A pair of aligned holes 40–40 are formed in the end 36 on either side of the slot 38 remote from the bottom of the free end 36. A pin 42 is disposed in holes 40–40, and extends across the slot 38. The pin 42 intersects the axis 30 of the saw bar 28, as best seen in FIGS. 2 and 3.

An aperture 44 of circular shape extends from the outer periphery of one side of the free end 36 therethrough to intersect the longitudinal slot 38 whereby the respective slot 38 and aperture 44 are each in communication with the axis 30. The diameter D of the aperture 44 is greater than the width W of the side of the free end 36 in which the aperture 44 is formed. A ball 46, which may also be designated a cam means or holder is disposed in the aperture 44. The diameter of the ball 46 is substantially equal to or slightly less than the diameter D of the aperture 44 so as to permit the ball 46 to be freely movable within the aperture 44, while extending outwardly on either side thereof to project into the longitudinal aperture 38 or to extend beyond the outer periphery of the free end 36, or both.

Annular grooves 48–48 are formed on the outer periphery of the free end 36 on either side of the aperture 44 so that upon slipping a collar 50 upon the free end 36 at the local of the aperture 44 split ring clamps 52–52 may be disposed into the grooves 48–48 to axially clamp the collar 50 to the free end 36, while permitting turning movement thereof. The collar 50 may also be termed a holder. The collar 50 has a central circular opening 54 as seen in FIGS. 3 and 6 which is sized to permit easy turning of the collar 50 upon than the diameter of the free end 36 of the saw bar 28. The central opening 54 is eccentrically grooved as at 55 to define a cam surface engageable with the ball 46 upon turning of the collar 50 to urge the ball 46 into the aperture 44 as illustrated in FIG. 4. The collar 50 also acts to hold the ball 56 captive within the aperture 44. For operator convenience the collar 50 has finger recesses 56 between which knobs 58 are formed.

The shank of the saw blade or implement 34 is provided with an aperture 60 inwardly of the end and of a smaller diameter then the diameter D of the ball 46. The upper most surface of the shank has an arcuate recess 62 so that upon the saw blade being inserted upwardly into the longitudinal slot 38 from the bottom of the free end 36, the upper end of the shank of the saw blade 34 will seat against he pin 40 at the arcuate recess 62. The longitudinal distance between the recess 62 and the aperture 60 coincides with the centerline distance between the pin 42 and the aperture 44. Accordingly prior to insertion of the saw blade 34 the collar 50 is adjusted to the position shown in FIG. 5 which permits the ball 46 to remain out of the longitudinal aperture 38. Thereafter, the blade 34 is inserted in the slot 38 to place the aperture 60 in alignment with aperture 44 so that upon turning the collar 50 the ball 46 is shifted inwardly into the longitudinal aperture 38 by the camming action of the cam surface 55. In its locked position the chuck assembly 41 causes the ball 46 to contact the aperture 60 in the shank of the saw blade 34 as best seen in FIGS. 3 and 4. Thus the saw blade 34 will remain locked within the longitudinal aperture 38 of the saw bar 28 until the collar 50 is turned to its unlocked position, illustrated in FIG. 5 freeing of the ball from within the apertures 60 and 38 to permit the blades 34 withdrawal from the longitudinal aperture 38. Since the ball 46 is permitted free movement within the aperture 44 it will contact the saw blade 34 at different points of its spherical surface each time it acts to lock the saw blade 34 to the saw bar 28 so as to minimize its wear.

If desired the surface of the collar 50 and saw bar 28 may be appropriately marked to show the locked and unlocked position of the chuck assembly 41.

It will be understood that various changes in the details, materials, arrangements of parts and operating conditions which have been herein described and illustrated in order to explain the nature of the invention may be made by those skilled in the art within the principles and scope of the invention as expressed in the claims.

I claim:

1. In a power tool having a housing and an electric motor for driving an implement, the combination of:
   a. a toolbar journaled in the housing and connected to be driven by the motor,
   b. the toolbar having a free end projecting from the housing,
   c. an aperture formed at the free end of the toolbar to extend axially inwardly therefrom,
   d. a collar means connected to the toolbar to surround a portion of the axial aperture thereof, and to be continuously turnable thereon prior to the implement being connected,
   e. a cam surface formed on the inner periphery of the collar means, which surface is of successively decreasing radius,
   f. a transverse opening extending through one side the free end of the toolbar to place the cam surface in communication with the axial aperture, and
   g. cam means held captive in the transverse opening by the collar means and adapted to be increasingly urged into the axial aperture lockingly to engage the implement upon the collar means being turned.

2. The combination claimed in claim 1 in which the power tool has a reciprocating toolbar to which the implement is affixed, and wherein:
   a. the toolbar defines a saw bar,
   b. the cam means is a ball, and
   c. the ball is engaged by the successively decreasing radius of the cam surface of the collar means whereby on turning of the collar means the ball is increasingly driven into locking engagement with the implement.

3. The combination claimed in claim 1 wherein:
   a. the collar means is turned through an angle of less than 180° in clamping the implement to, or releasing the implement from the saw bar.

4. The combination claimed in claim 2 wherein:
   a. the ball has a diameter greater than the width of the side in which the transverse aperture is formed whereby the ball simultaneously extend into the axial aperture and outwardly of the transverse aperture.